(No Model.)
E. GENGENBACH.
VOLTMETER AND AMPERE METER.
No. 495,086. Patented Apr. 11, 1893.
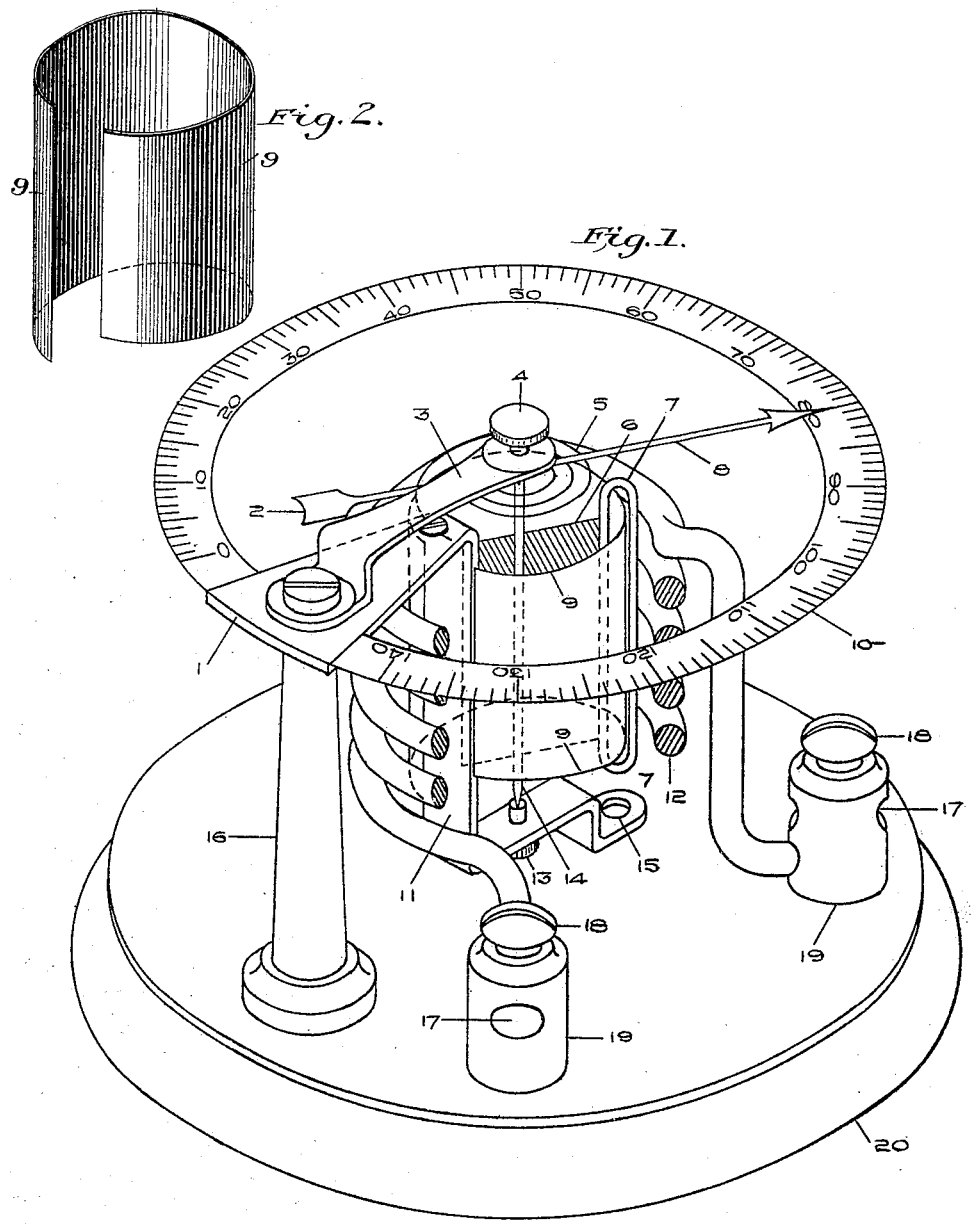
WITNESSES:
INVENTOR
Eugen Gengenbach
By Henry Price Ball
ATTORNEY

UNITED STATES PATENT OFFICE.

EUGENE GENGENBACH, OF SCHENECTADY, NEW YORK.

VOLTMETER AND AMPÈRE-METER.

SPECIFICATION forming part of Letters Patent No. 495,086, dated April 11, 1893.

Application filed May 13, 1892. Serial No. 432,859. (No model.)

*To all whom it may concern:*

Be it known that I, EUGENE GENGENBACH, a citizen of the United States, residing at Schenectady, in the county of Schenectady and State of New York, have invented a new and useful Voltmeter and Ampère-Meter, of which the following is a specification.

My invention relates to improvements in instruments for measuring the pressure or flow of electric currents and the objects of my improvement are to construct an instrument that will be accurate and durable and yet cheap to manufacture. I attain these objects by the mechanism illustrated in the accompanying drawings, in which—

Figure 1 gives a general view of the instrument, showing its construction as an ampère meter, while Fig. 2 shows the drum used in the solenoid.

Referring to Fig. 1 20 is the base upon which the instrument is mounted. The latter consists essentially of the coil 12 through which the current passes, the sheet iron drum 9 shown also in Fig. 2 the scale 10, the elongated ring 7 arranged to rotate around the drum carrying with it the pointer 8 balanced with the counterpoise 2.

The drum 9 Fig. 2 is made of very soft wrought iron and very thin. It is bent into a cylindrical form and is so constructed that one end of the same is broader than the other before rolling into shape. By making this sheet of the proper form it is possible to get perfectly even divisions on the scale. It is held in position by the part 11 which is slotted on the sides to receive it. Surrounding this cylindrical drum, and a short distance away from it, is mounted the coil of wire 12 Fig. 1 around which the current passes. In the case of an ampère meter, as shown, this wire will be large, while in the case of a volt meter, this wire will be small in diameter. Other than this the two instruments are alike and need no separate specifications.

Completely encircling the drum and yet not touching it is the endless loop 7 which is so arranged that it can rotate around the drum from one end of it to the other and yet swing perfectly free from the same. This is accomplished by attaching the loop 7 to the radial wing 6 which is made of some non-magnetic metal and extends past the spindle 14 and is counterpoised on the opposite side in such a manner that the entire mechanism is perfectly balanced. This allows the instrument to be used in any position whatever. The spindle 14 is journaled in jeweled bearings 4 and 13 which are in the axis of the cylindrical drum 9.

To the upper end of the spindle 14 is attached the inner end of a spiral spring 5 the other end of which is clamped under an adjusting screw on plate I as shown. Above this spiral spring is fastened the pointer 8, which indicates on the scale 10 directly the number of ampères flowing through the instrument in the case of the ampère meter or the number of volts it is connected across in the case of the volt meter. The current passing around the drum 9 through the wires 12 magnetizes the drum. It at the same time magnetizes the loop 7. Now inasmuch as similar poles are formed at the ends of the drum 9 and loop 7 which are in close proximity, they repel each other and as the loop 7 is free to move it passes to the place where the repelling force is balanced by the spring 5. This spring brings the pointer back to zero when no current is flowing. The instrument is dead beat from the fact that loop 7 forms a short circuited path for the eddy currents generated therein. The web or wing 6 also helps to make the instrument dead beat as it forms a fan inside of the cylindrical drum 9 perfectly free to rotate therein. As a matter of fact there is practically no vibrations of the needle from this construction. The binding posts 19 with opening 17 for the attaching wires and screws 18 for clamping the same make it easy to connect and disconnect the same from the circuit. In the case of a volt meter the wire would be wound on a spool, otherwise the construction would be the same as that already explained.

Having described my invention so that any one skilled in the art to which it pertains could manufacture the same, what I claim, and desire to secure by Letters Patent, is—

1. An instrument for measuring the pressure or flow of electric currents consisting of a solenoid through which the current passes, a magnetizable drum located inside of said solenoid and a loop of wire arranged to rotate around said drum.

2. An instrument for measuring the pressure or flow of electric currents consisting of a solenoid through which the current passes, a magnetizable drum or circularly bent part of sheet metal located inside of said solenoid and a loop of wire arranged to rotate on an axis coinciding with the axis of the drum.

3. An instrument such as described consisting of a solenoid through which the current passes, having located therein a magnetizable sheet of metal of varying width bent into a cylindrical form and a loop of magnetizable metal encircling said sheet metal and means whereby it can rotate around a center coinciding with the axis of the sheet metal part.

4. An instrument for measuring the pressure or flow of electric currents, consisting of a solenoid through which the current passes, a sheet metal part of varying width located in said solenoid and a magnetizable part pivoted so to rotate in close proximity to said sheet metal part, the latter movable part carrying with it a pointer over a scale as described.

5. In an instrument for the purpose specified, the combination of a solenoid through which the current can pass, a sheet metal drum located in said solenoid and a magnetizable loop of metal free to rotate close to but not touching said sheet metal drum.

6. In an instrument for the purpose specified, the combination of a solenoid through which the current can pass, a sheet metal drum located in said solenoid and a magnetizable loop of metal free to rotate close to but not touching said sheet metal drum. A spring against which the loop acts and means of adjusting said spring.

7. In an instrument for measuring the pressure or flow of electric currents, the combination of a solenoid having therein a magnetizable drum of sheet metal of varying width, said drum, a movable part free to rotate around said drum, a spring against which the movable part acts, a pointer attached to said movable part and a scale as specified.

8. An instrument of the kind specified, consisting of a solenoid in which is located a magnetizable drum of sheet metal, a movable loop of wire free to rotate on a pivot centrally located in said drum and a fan carried by said pivot for the purpose specified.

9. In an instrument for the purpose specified, the combination of a solenoid and a magnetizable drum located therein, a movable part free to rotate around said drum, a pivot centrally located in relation to said drum and carrying said movable part, and also a fan located inside of said drum, and said fan.

EUGENE GENGENBACH.

Witnesses:
HENRY PRICE BALL,
AMANDUS METZGER.